July 17, 1962     D. B. WHEELER ETAL     3,044,679

COMPOSITE PACK WITH EXPANDABLE HONEYCOMB PARTITION

Filed Jan. 6, 1961     3 Sheets-Sheet 1

INVENTORS
DONALD B. WHEELER
WALTER B. KENNEDY
BY
Charles P Bauer
ATTORNEY

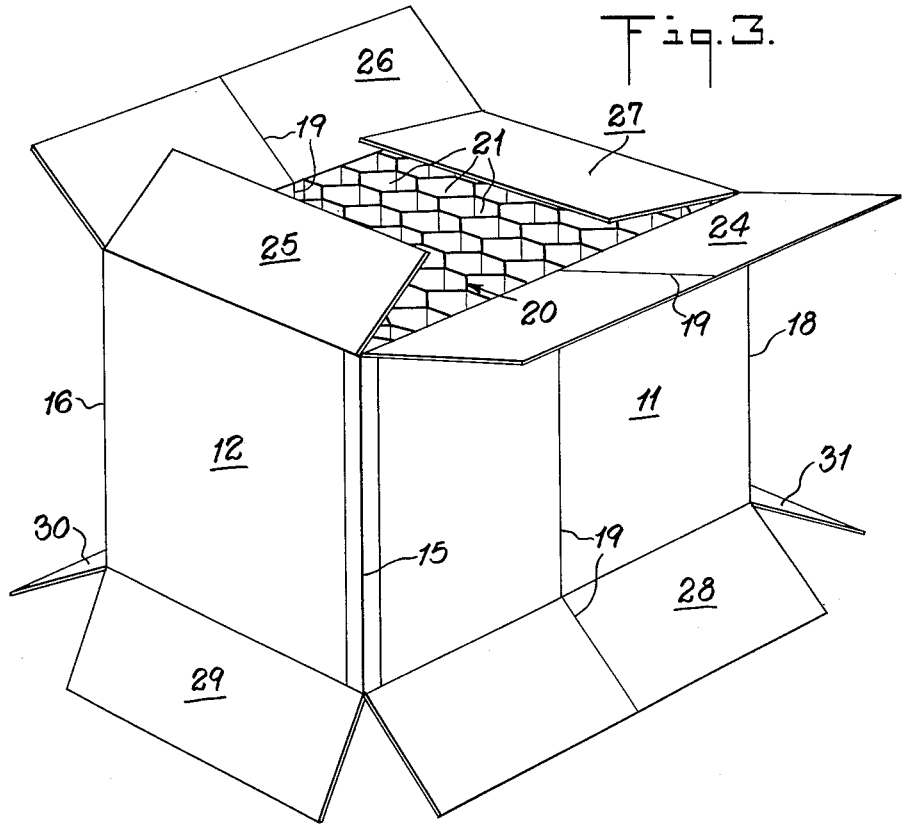
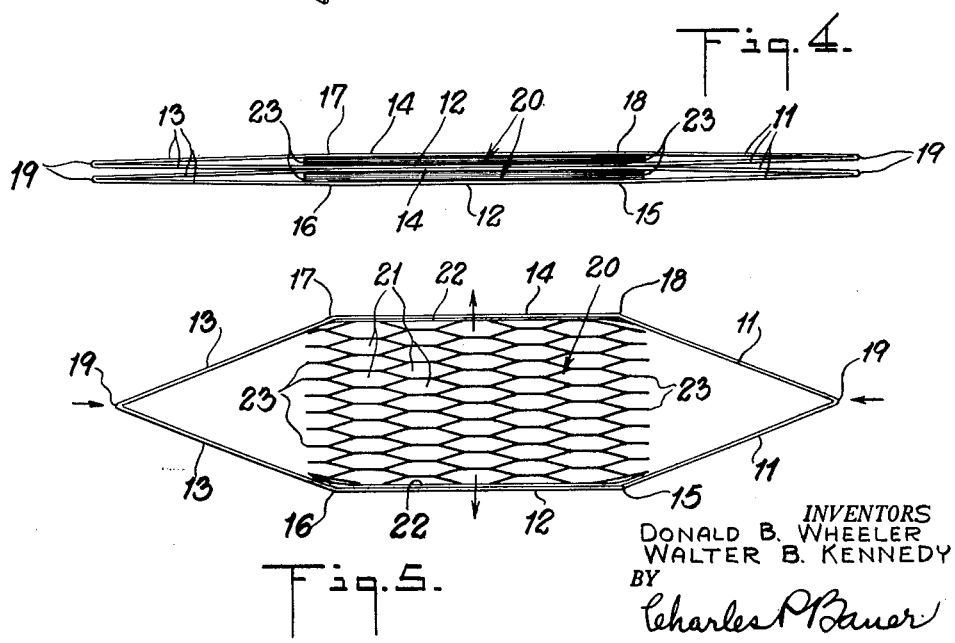

July 17, 1962 D. B. WHEELER ETAL 3,044,679
COMPOSITE PACK WITH EXPANDABLE HONEYCOMB PARTITION
Filed Jan. 6, 1961 3 Sheets-Sheet 3
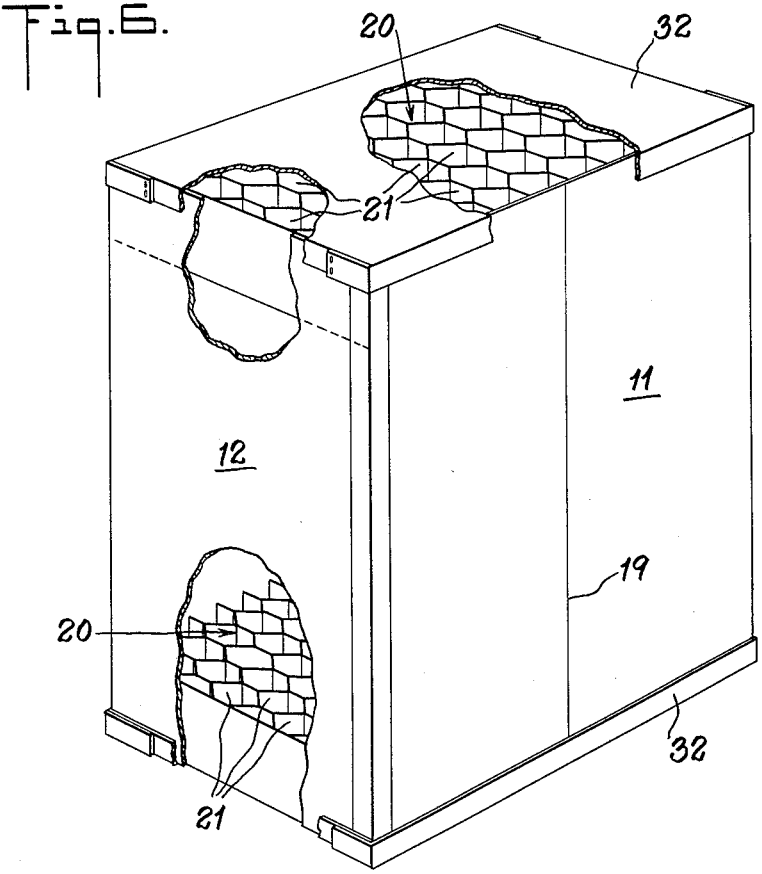
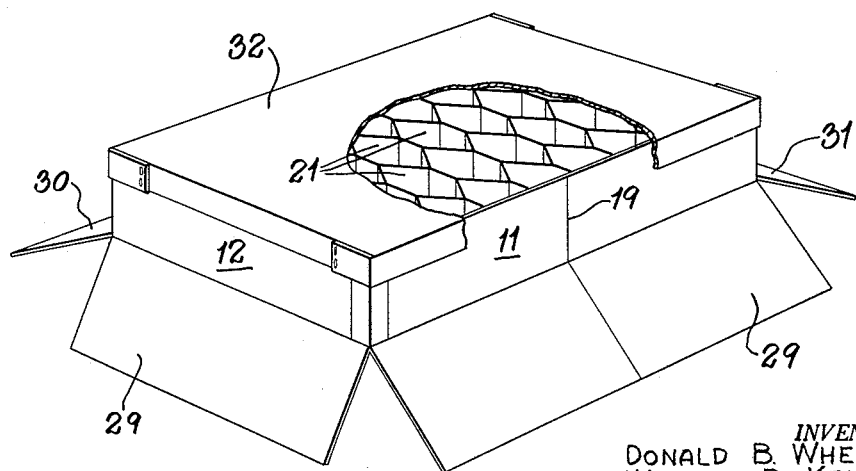
INVENTORS
DONALD B. WHEELER
WALTER B. KENNEDY
BY
Charles P. Bauer
ATTORNEY ized July 17, 1962

3,044,679
COMPOSITE PACK WITH EXPANDABLE HONEYCOMB PARTITION

Donald B. Wheeler and Walter B. Kennedy, Hudson Falls, N.Y., assignors to Union Bag-Camp Paper Corporation, New York, N.Y., a corporation of Virginia
Filed Jan. 6, 1961, Ser. No. 81,115
9 Claims. (Cl. 229—15)

The present invention relates to improvements in packaging. More particularly it pertains to a new and improved collapsible carton or carton insert with an expandable honeycomb filler.

An object of the invention is to provide a carton with a honeycomb partition, which carton and partition can be shipped in flat form and then set up and expanded to provide a container with a cellular structure therein to receive articles such as light bulbs or tubes, bottles, branches for artificial Christmas trees and other similar items which are fragile and require separation and cushioning during shipment.

A further object is to provide an insert for cartons with a honeycomb filler which can be shipped in flat form and then set up and expanded for insertion into a carton for shipment of articles as heretofore mentioned.

A further object is to provide a composite pack as described herein which not only serves as a divider for individual articles but also gives a cushioning effect between such articles and the container walls.

A further object is to provide a carton or carton insert having a cellular structure, which can be made with cells of different size and shape for the particular articles to be inserted therein and can be set up and expanded by hand and without the necessity for special tools or equipment.

A further object is to provide a composite pack of the character stated which is simple in design, is rugged in construction, can be economically and simply manufactured, and is well suited for its intended purpose.

Other objects of the invention will in part be obvious and will in part appear hereinafter.

The invention accordingly comprises an article of manufacture possessing the features, properties and the relation of elements which will be exemplified in the article hereinafter described and the scope of the application of which will be indicated in the claims.

For a fuller understanding of the nature and objects of the invention, reference should be had to the following detailed description taken in connection with the accompanying drawings, in which:

FIGURE 3 is a perspective view of a carton with a honeycomb filler in expanded form to receive articles into the cells, after which the flaps of the carton can be closed;

FIGURE 4 is an end view of a pair of the tubes of FIGURE 1 in collapsed form;

FIGURE 5 is an end view of the tube of FIGURE 1 showing such tube and honeycomb in partially expanded form;

FIGURE 6 is a perspective view of a modified form of the tube of FIGURE 1 with top and bottom closure caps to form a complete carton; and FIGURE 7 is a perspective view of a smaller carton similar to FIGURE 3 but having closure flaps at one end and a closure cap at the opposite end.

Figure 1:
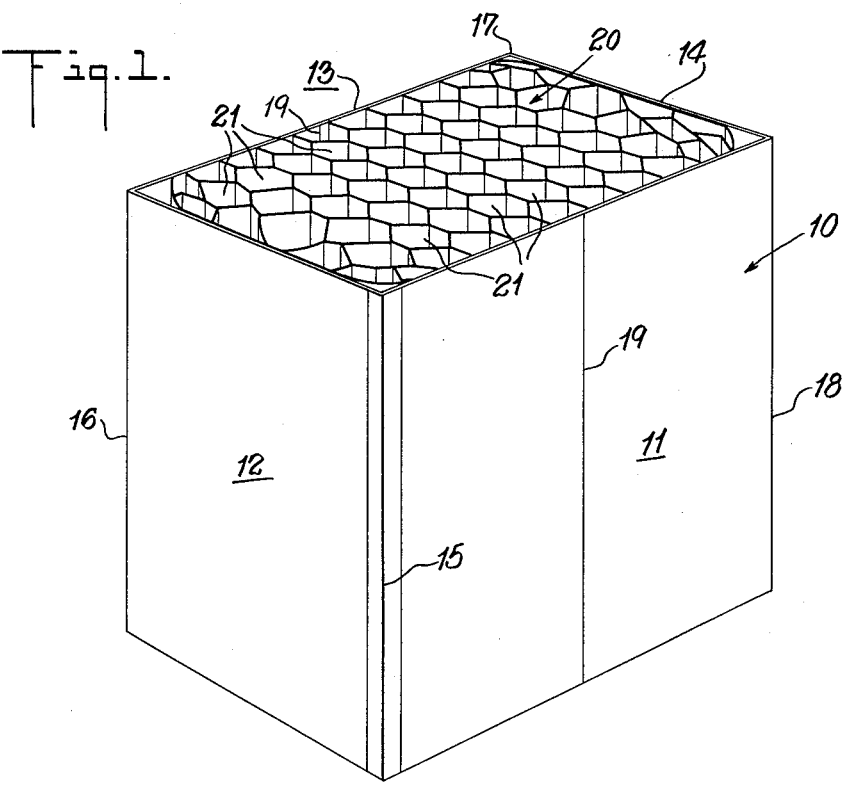
FIGURE 1 is a perspective view of a tube with a honeycomb filler, all in expanded form, either for insertion into a carton or for the attachment of end caps to form a complete carton.

The "honeycomb structure" or "honeycomb material" referred to in the specification and claims and shown in the drawings is made up of a plurality of open-ended cells which may be of any desired size and shape, for example, hexagonal, circular, oval or rectangular. Such structure may be formed of any desired material such as paper, cloth, metal or the like. However, since such structure must be collapsed into flat form it has been found preferable to construct the same of paper or paperboard.

The paper honeycomb structure may be produced by superimposing sheets of paper upon each other until a thick stack is formed, each sheet of this stack being held to the one above it, by adhesive or other means, along spaced and generally parallel lines, with the lines on one side of each sheet between the lines on the other side of said sheet. It will be seen that the distance between such lines determines the cell size. By cutting this stack at a right angle across the lines holding the sheet together, pieces may be obtained of a length corresponding to the desired depth of the honeycomb structure to be used in the tubes or cartons shown or described herein. The thickness of the pad or stack may be varied and is dependent upon the number of cells required for the intended use. These pieces are then expanded into the shape and form shown in FIGURE 2. It will be understood that the cell wall thickness depends on the weight of paper used. Since the honeycomb structure varies with both the cell wall thickness and cell size, these may be varied to meet practically any requirements. Where additional rigidity or strength is required or where the pad is used in places where it will be subjected to high humidity or moisture, which softens or weakens the paper, the paper may be impregnated or coated with resin, sulphur, metal or similar products. This may be done prior to the forming of the paper into the honeycomb structure or after.

Where the honeycomb structure is to be made of other materials, for example, cloth or metal, other known methods may be used to construct the desired structure. It will be understood that the honeycomb material itself and the method of manufacturing it are well known and are therefore not specifically claimed herein.

Referring more particularly to the drawings, there is shown in FIGURE 1 a tube 10 made up of walls 11, 12, 13 and 14 defined by the score lines 15, 16, 17 and 18. The ends of the walls 11 and 12 are joined together by a tape to complete the tube, but this can also be accomplished by a lap joint either stitched or glued. It is also possible to form the tube with two lapped or taped joints, for example, at the median fold lines 19. This tube can be constructed of rigid or semi-rigid materials, such as board, metal, plastic, wood or similar materals, or a combination of them. Corrugated board has been found quite satisfactory for both the tube and the carton described herein, because it can be folded and scored into its shape without extra attachments such as hinges or the like, which would be needed for a rigid material such as metal or wood. Two opposite sides 11 and 13 of the tube are provided with median fold lines 19 for the purpose hereinafter described.

Figure 2:
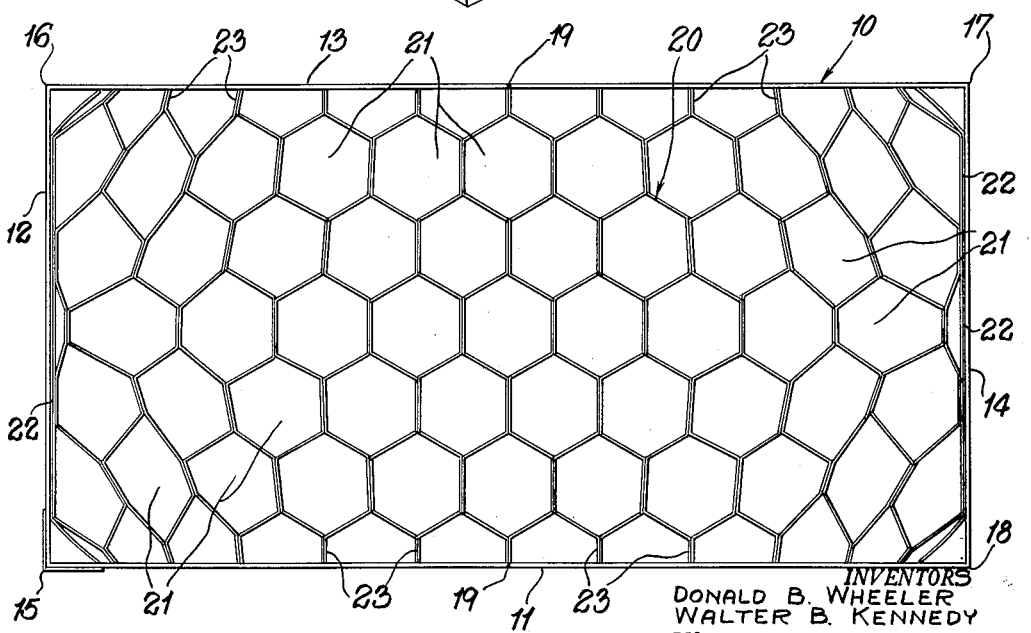
FIGURE 2 is an end view of the tube of FIGURE 1 showing the honeycomb filler secured to two opposite sides of the tube.

Secured within this tube is a honeycomb filler 20 made up of a plurality of cells 21. The manner of securing such honeycomb filler within the tube is shown in greater detail in FIGURES 2 and 5. FIGURE 5 shows the outside facing sheets 22 of the honeycomb filler 20 bonded by adhesive or secured by other means to the opposite walls 12 and 14 of the tube. It will be seen that the particular type of honeycomb made up of flat sheets is especially satisfactory because it affords flat outside facings for an effective bond to the walls of the tube. It will be noted that the opposite sides 23 of the honeycomb filler extend beyond the score lines 15, 16, 17 and 18 when the tube is in collapsed or partially collapsed form. This is due to the fact that the opening of the cells during expansion of the honeycomb causes the unsecured sides to move together so that the edges of the incomplete cells will touch the sides 11 and 13 of the tube when such tube is fully opened. Hence, it is necessary that the honeycomb filler be of the proper dimensions to completely fill the expanded tube as shown in FIGURE 2. It should be further noted that the honeycomb filler is bonded or secured to the narrowest opposite walls of the tube or container so that greater expansion of the cells is provided. If the outside facing sheets of the honeycomb are bonded to the widest dimensions of the tube the interposed sheets cannot shift after bonding with the result that any cells adjacent such sheet will not open or will only partially open. This is illustrated in FIGURE 2 where the cells adjacent walls 12 and 14 are not fully expanded. The purpose of the median fold lines 19 is evident from an examination of FIGURE 5 which shows that pressure on such fold lines causes the walls 11 and 13 to set up to the form illustrated in FIGURE 1. At the same time the pressure on these fold lines causes the sides 12 and 14 to move apart and expand the cells of the honeycomb filler into the form illustrated in FIGURE 2. Thereafter, it is only necessary to retain such walls 11 and 13 in flat form to keep the tube and cells fully expanded and ready to receive the articles to be shipped.

As heretofore pointed out, the tube of FIGURE 1 can be inserted into a separate container or box for shipment. However, it is also possible to provide this tube with top flaps 24, 25, 26 and 27 and bottom flaps 28, 29, 30 and 31 as shown in FIGURE 3. In such case the tube provided with flaps, which is now a carton, can be retained in expanded form by folding over the flaps at one end and taping or stitching them in position. The container is then filled with articles inserted into the cells after which the flaps at the top end are likewise folded and taped or stitched.

FIGURE 6 shows a modification in which the tube of FIGURE 1 is closed at either end by suitable covers or caps 32 to form a complete carton. This figure also illustrates a further modification where a honeycomb filler can be located at each end of the tube rather than run the full length of the tube. Such construction is further discussed hereinafter.

FIGURE 7 is a further modification in which the tube at one end is provided with flaps, as shown in FIGURE 3, and at the other end with a cap, such as is shown in FIGURE 6. The container of FIGURE 7 is rather flat in height and is intended for packing and shipping small articles. In contrast, the tube of FIGURE 1 or cartons of FIGURES 3 and 6 are intended for long, thin articles which might be several feet in length, for example, fluorescent light tubes.

FIGURE 4 illustrates how a multiple or series of collapsible tubes can be stacked in flat form. Furthermore, it is possible to secure two or more of those tubes together to increase the dimensions of the expanded tube without increasing the width in flat form such as would be necessary if only one tube of the same dimension were used. Such series of tubes can be closed by suitable caps or covers as shown in FIGURE 6.

The packaging of fluorescent light tubes serves as a good example of the adaptability of the present invention for different conditions. These tubes vary in length anywhere from approximately one foot up to eight feet. In the short lengths the carton of FIGURE 3 or the tube of FIGURE 1 could be used. For a light tube four feet in length the same carton or tube could be used, but it might be more feasible or economical to use a carton or tube in which the honeycomb filler is positioned at each end, as is shown in FIGURE 6. For a light tube eight feet in length it might be deemed advisable to use a carton or tube in which the honeycomb filler is not only positioned at each end but is spaced at intervals to afford further support. Furthermore, where the long length light tubes are involved, it is also possible to use a series of the tubes of FIGURE 1, in which case these honeycomb tubes could be spaced at intervals in a carton and spot pasted to hold them in place.

Since certain changes may be made in the above product and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described our invention, what we claim as new and desire to secure by Letters Patent is:

1. A collapsible cellular pack for shipping articles inserted into the cells comprising a tube defined by four side walls hingedly connected, median fold lines in two opposite side walls extending from the top to the bottom of the tube, and an expandable preformed honeycomb filler consisting of a plurality of open ended cells formed of superimposed sheets of flexible material joined at parallel striped adhesive lines and cut at right angles to these lines, said filler extending between and secured only to the other two opposite side walls, whereby said tube and filler can be collapsed into flat form and expanded into a pack with open cells to receive articles there being thus provided opposite sidewalls of filler defining closed edge cells which are adhesively secured to corresponding inner walls of said tube and the remaining opposite side walls of said filler being formed of partial cells which are open so that the edges of said cells will each touch and meet the other side walls of said tube.

2. The pack of claim 1 in which flaps are hinged to the tops and bottoms of the walls to provide closures for each end of the tube.

3. The pack of claim 1 in which caps are provided to fit over and cover each end of the tube.

4. The pack of claim 1 in which the honeycomb filler extends substantially the full length of the tube.

5. The pack of claim 1 in which honeycomb filler is spaced at intervals in the tube.

6. A collapsible cellular pack for shipping articles inserted into the cells comprising a tube defined by four side walls hingedly connected, said tube being of rectangular cross sections when expanded with two opposite walls longer than the other two opposite walls, median fold lines in the two longer walls extending from the top to the bottom of the tube, an expandable preformed honeycomb filler consisting of a plurality of open ended cells formed of superimposed sheets of flexible material joined at parallel striped adhesive lines and cut at right angles to these lines, said filler extending between and secured only to the two shorter walls, whereby said tube and filler can be collapsed into flat form and expanded into a pack with open cells to receive articles there being thus provided opposite sidewalls of filler defining closed edge cells which are adhesively secured to corresponding inner walls of said tube and the remaining opposite side walls of said filler being formed of partial cells which are open so that the edges of said cells will each touch and meet the other side walls of said tube.

7. The pack of claim 6 in which the honeycomb filler is adhesively secured to the two shorter walls.

8. The pack of claim 6 in which flaps are hinged to the tops and bottoms of the walls to provide closures for each end of the tube.

9. The pack of claim 6 in which each of the side edges of the honeycomb filler is cut through the end cells, whereby in unexpanded form the free cell boundaries extend on each side beyond the walls to which the top and bottom edges are secured and upon expansion of the tube and said filler the space between the longer walls and the closed cells at the edge of each free side of the honeycomb filler is filled with partial cells having the end boundary formed by the inner side of said longer walls.

References Cited in the file of this patent

UNITED STATES PATENTS

| | | |
|---|---|---|
| 597,525 | McLane | June 18, 1898 |
| 961,889 | Nagle | June 21, 1910 |
| 1,053,576 | Crane | Feb. 18, 1913 |
| 1,120,752 | Smiley | Dec. 15, 1914 |
| 1,998,737 | Reich | Apr. 23, 1935 |
| 2,048,776 | Brown | July 28, 1936 |
| 2,706,935 | Pasjack | Apr. 26, 1955 |
| 2,739,735 | Anderson | Mar. 27, 1956 |